Figure 1:
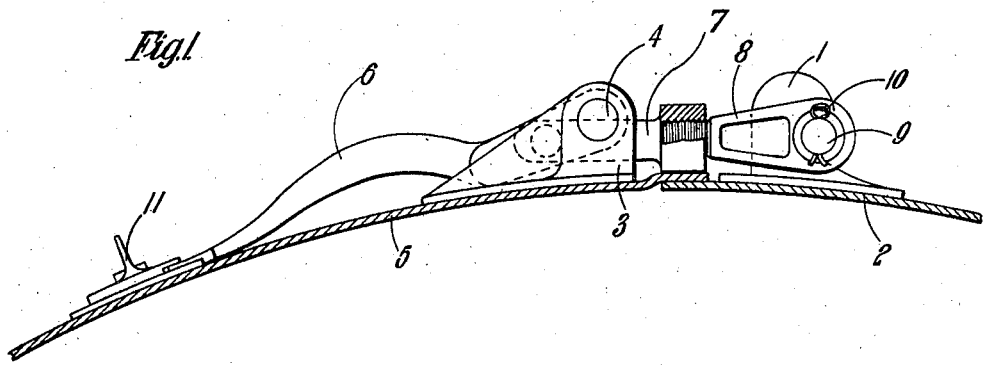

July 17, 1923.

W. JEPSON

WASH MACHINE

Filed March 14, 1922

Inventor
W. Jepson

Patented July 17, 1923.

1,462,286

UNITED STATES PATENT OFFICE.

WILLIAM JEPSON, OF LONDON, ENGLAND.

WASH MACHINE.

Application filed March 14, 1922. Serial No. 543,681.

*To all whom it may concern:*

Be it known that I, WILLIAM JEPSON, a British subject, residing at 47 Lofting Road, Liverpool Road, Barnsbury, London, N., England, have invented certain new and useful Improvements in Wash Machines, of which the following is a specification.

This invention relates to washing machines having rotary cages which usually reciprocate in a chamber containing water. In such cages, which are intended to hold a charge of material requiring to be washed, difficulty has been experienced in providing a fastening for the door of the cage which shall be absolutely secure in operative position and capable of remaining reliable on protracted use under the circumstances of vibration and shock under which the cage is normally used.

The present invention has for its object to provide a fastening which shall be simple to operate and secure in operation.

A further object of the invention is to provide a fastening which does not tend to fly open as the door tends to move under pressure of the contents of the cage.

A further object of the invention is to provide a fastening which will be adjustable to take up wear and to regulate the force of its operation.

A further object is to provide a fastening that will ensure a firm seating of the edge of the door on the edge of the cage so as to avoid loss of water from the latter.

With these and other objects in view, the invention consists in the means hereinafter described and set out in the accompanying claims.

According to the invention I provide an improved fastening device between the cage and the door comprising on the one part a fixed abutment such as a hook and on the other part a reversely-directed hinged lever carrying a hinged member adapted to engage with said hook.

Further, as in such cages the lip of the door in the closed position usually overlaps the edge of the aperture of the cage, I provide on the hinged member an element which in the locking position presses upon the lip of the door so as to cause it to engage tightly with the edge of the cage.

In a preferred form, I provide on the door two blocks supporting a shaft on which is hinged by one extremity a lever which is free to move in the plane of rotation of the cage, the lever having a tail adapted to be secured by a turn button or other fastening in the locking position wherein its free end is directed away from the door of the cage. Pivotally mounted on the lever at a point intermediate its hinged and free ends is a T-shaped link hinged by its foot and carrying at the ends of its transverse portion a pair of eye-bolts adapted when the door is shut and the lever is in the unlocking or raised position to extend one on either side of a hook mounted on the fixed part of the cage. A transverse bar secured to the free ends of the bolts is adapted in this position to be situated behind the lip of the said hook. If now the lever is rotated to the locking position by a movement away from the said hook, the bar is caused forcibly to engage underneath the lip of said hook; and the arrangement is such that when the parts are in the final closed position the plane containing the two bolts passes underneath the axis of rotation of the lever so that the articulated mechanism has been moved past its dead centre and the fastening means does not tend to pull open.

The transverse element of the T-shaped link constitutes a block adapted in the closed position to seat itself on the lip of the door and cause it firmly to be pressed on the edge of the cage with which it engages.

This form of the invention is illustrated in the accompanying drawings in which—

Figure 2:
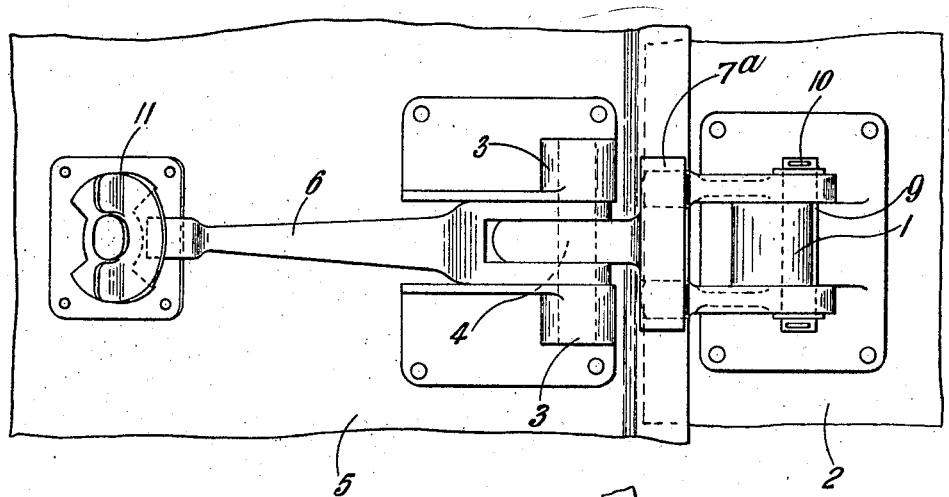
Figure 3:
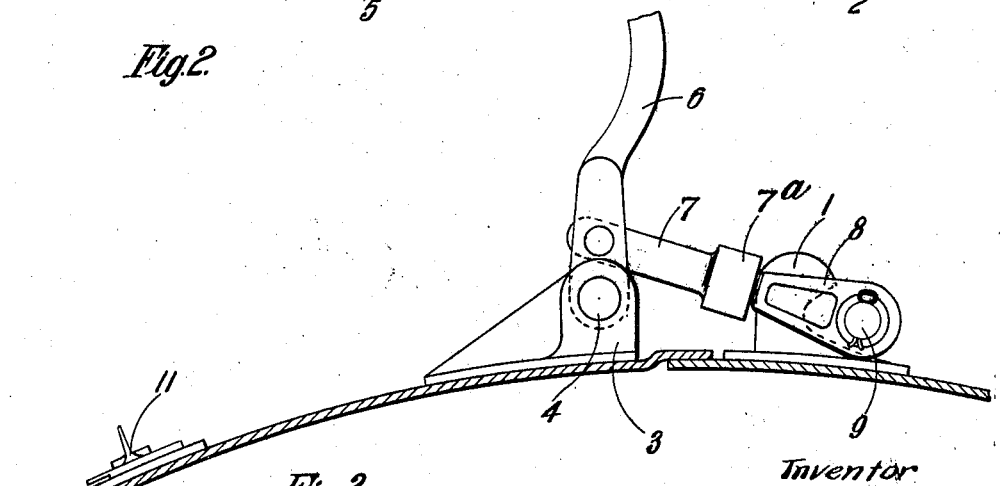

Fig. 1 represents an elevation,

Fig. 2 a plan of the preferred form in the closed position,

Fig. 3 showing the fastening in the open position with part broken away.

Referring now to the drawings, the hook 1 is fixedly mounted on the part 2 of the cage, and the two blocks 3 carrying the shaft 4 are mounted on the free end of the hinged door 5. The lever 6 is pivotally mounted at one end upon the shaft 4, and pivotally mounted by means of its foot upon the lever is a T-shaped link 7. A pair of eye-bolts 8 which are normally directed towards the hook at their free ends, are carried by the ends of the transverse element 7$^a$ of the link. The bolts are united by a rod 9 secured in position by pins 10. The bolts illustrated are of special form with strengthening webs; and the transverse part of the link 7 forms a block adapted to engage with the lip of the door and press it closely upon the end of the cage as clearly shown in Figure 1. A turn-button 11 is provided to engage the heel of the lever 6 when in the closed position. The eye-bolts are mounted on the links by screwing so that their position may be adjusted.

It will be realized that when the fastening is locked as shown in Figure 1, owing to the resilience of the cage door and/or wall, the plane containing the link 7 is adapted to be brought below the axis of the shaft 4, and that in this position the tension on the bolts 8 does not tend to unlock the fastening, owing to the fact that the mechanism has been moved past the dead centre position.

Owing to the adjusability of the bolts 8 due to the provision of the screw threads thereon, the fastening can be continually adjusted to take up any wear that may occur in any of the parts, so that it will therefore be capable of repeated use without becoming unreliable, and the bolts can further be set so as to give any required degree of force in the operation of the fastening.

It will be realized that in operation the lever 6, and the link 7 and elements carried thereby, constitute a kind of toggle mechanism wherein the joint by which the link 7 is pivoted constitute the toggle joint; and that when the toggle joint is in the set up position rotated away from the hook and beyond the position of the dead centre, the toggle mechanism will forcibly engage with said hook to form a secure fastening which will not tend to fly open under pressure from the door. Owing to the adjustability of the eye-bolts the force of the toggle can be adjusted to any suitable requirement to accommodate itself to the resilience of the door 5 and cage wall 2.

I claim:—

1. A washing machine, a door therefor, a toggle mechanism hingedly mounted on one of said parts, a projection on the other of said parts to be engaged by said toggle mechanism, and an element formed on the toggle mechanism to engage and bear directly upon the door when the toggle mechanism is in locked relation.

2. In a washing machine, a cage, a door therefor, a fixed abutment on the cage, toggle levers pivotally supported on the door, one of said levers being adapted to engage the fixed abutment, means for adjusting the length of said latter lever, and an enlargement on said latter lever to bear directly upon the edge of the door when the toggle levers are in locked relation with said abutment.

3. In a washing machine, a cage, a door therefor having a cage lapping edge, an abutment on the cage, a handle lever pivotally supported on the door, a locking lever pivotally connected to the handle lever and having its free terminal adapted to engage the abutment, said locking lever being formed in two parts adapted for threaded connection, one of said parts having an enlargement to overlie and bear on the lapping edge of the door when the levers are in locking relation with said abutment.

4. In a washing machine, a cage, a door therefor having a cage lapping edge, an abutment on one of said parts, a handle lever pivotally supported on the other of said parts, a locking lever pivotally connected to the handle lever and having its free terminal adapted to engage the abutment, said locking lever being formed in two parts adapted for threaded connections, whereby to permit adjustment to compensate for wear.

In testimony whereof I affix my signature.

WILLIAM JEPSON.